(12) United States Patent
Kumaki

(10) Patent No.: US 7,508,416 B2
(45) Date of Patent: Mar. 24, 2009

(54) IMAGE PICK-UP APPARATUS

(75) Inventor: Jinyo Kumaki, Tokyo (JP)

(73) Assignee: Sony Corporation (JP)

( * ) Notice: Subject to any disclaimer, the term of this patent is extended or adjusted under 35 U.S.C. 154(b) by 551 days.

(21) Appl. No.: 10/507,034

(22) PCT Filed: Dec. 10, 2003

(86) PCT No.: PCT/JP03/15815

§ 371 (c)(1),
(2), (4) Date: Sep. 8, 2004

(87) PCT Pub. No.: WO2004/066618

PCT Pub. Date: Aug. 5, 2004

(65) Prior Publication Data

US 2005/0122402 A1  Jun. 9, 2005

(30) Foreign Application Priority Data

Jan. 23, 2003  (JP)  ............... 2003-015165

(51) Int. Cl.
*H04N 5/228* (2006.01)
(52) U.S. Cl. ................. 348/208.4; 348/208.1
(58) Field of Classification Search .............. 348/208.1, 348/208.4, 208.6
See application file for complete search history.

(56) References Cited

U.S. PATENT DOCUMENTS 6,853,401 B2 * 2/2005 Fujii et al. ............... 348/223.1

2005/0168581 A1 * 8/2005 Shinohara et al. ........ 348/208.1
2006/0262193 A1 * 11/2006 Kumaki .................. 348/208.6

FOREIGN PATENT DOCUMENTS

| JP | 07-143393 | 6/1995 |
|---|---|---|
| JP | 09-005867 | 1/1997 |
| JP | 10-322591 | 12/1998 |
| JP | 11-196301 | 7/1999 |
| JP | 2000-032331 | 1/2000 |
| JP | 2000224470 A * | 8/2000 |
| JP | 2000-341577 | 12/2000 |
| JP | 2001-036796 | 2/2001 |
| JP | 2001-100264 | 4/2001 |
| JP | 2002-131799 | 5/2002 |

* cited by examiner

*Primary Examiner*—Tuan V Ho
(74) *Attorney, Agent, or Firm*—Lerner, David, Littenberg, Krumholz & Mentlik, LLP

(57) ABSTRACT

When an operation mode of a digital camera is the manual focus control mode and an auxiliary function is performed, a microcomputer serves to set an enlarged image generation region, a signal processing unit implements processing to an image signal of the enlarged image generation region, and a display processing unit generates an image enlarged so as to take a predetermined size from an image signal processed by the signal processing unit to display the enlarged image on a display unit. The microcomputer sets the enlarged image generation region at a position moved manually from a predetermined position.

13 Claims, 15 Drawing Sheets

IMAGE PICK-UP APPARATUS

TECHNICAL FIELD

The present invention relates to an image pick-up apparatus such as video camera or still camera, etc., and more particularly to an image pick-up apparatus capable of displaying a picked-up image on a display unit.

This application claims priority to Japanese Patent Application No. 2003-015165, filed on Jan. 23, 2003, the entirety of which is incorporated by reference herein.

BACKGROUND ART

Hitherto, light-weight portable image pick-up apparatuses such as digital still cameras and video cameras have become popular. Since such small-sized image pick-up apparatuses are small and light in weight, but poor in stability, unwanted movement and/or vibration during picture-taking (hereinafter simply referred to as hand movement) is apt to take place.

In view of the above, small-sized image pick-up apparatuses capable of correcting such hand movement have been used. The hand movement correction is performed by detecting hand movement quantity (direction and magnitude of hand movement) and using the movement quantity to correct for image movement or shaking.

As a method of detecting hand movement quantity, there is mentioned a method in which an angular velocity sensor for detecting angular velocity in a vertical direction and an angular velocity sensor for detecting angular velocity in a horizontal direction are provided at a small-sized image pick-up apparatus, the detected angular velocities being used to detect hand movement quantity. In addition, there is mentioned a method of extracting components necessary for detection of hand movement quantity from an image signal of a previous frame and an image signal of a current frame, wherein hand movement quantity is detected by a representative point matching method, etc.

As a method of correcting image movement or shaking, there is mentioned a method in which a variangle prism (hereinafter referred to as VAP) is provided at a small-sized image pick-up apparatus to change the optical axis in accordance with detected hand movement quantity. However, when a VAP is provided at the image pick-up apparatus, miniaturization of the image pick-up apparatus is difficult because the lens unit becomes large.

On the other hand, as a method that lends itself to miniaturization of the image pick-up apparatus, there is mentioned, as shown in FIG. 1, the so-called electronic hand movement correction system in which there is provided a CCD (Charge Coupled Device) 200 having a region constituted by effective pixels (hereinafter referred to as effective pixel region) Y which is broader than an image generation region X from which an image signal finally serving as an output image is generated. The image generation region X is moved relative to the effective pixel region Y to thereby correct image movement or shaking by hand movement The electronic hand movement correction system prevents the shifting of frames due to the influence of hand movement, thereby generating images in which hand movement has been corrected.

Meanwhile, there are increasing numbers of image pick-up apparatuses capable of picking up both moving pictures (images) and still images. However, in the case of a still picture (image), when hand movement or shaking takes place within exposure time, image movement or shaking takes place because a picture signal which has been corrupted by hand movement is outputted from the image pick-up element.

However, in an electronic hand movement correction system, it is impossible to correct influence of hand movement during exposure. Namely, a small-sized image pickup apparatus employing an electronic hand movement correction system amendable to miniaturization cannot sufficiently correct for hand movement that occurs during generation of a still picture (image).

In view of the above, an image pick-up apparatus employing electronic hand movement correction provides improvement in picture quality in the case of moving images as compared to still images.

Further, in image pick-up apparatuses, there are instances in which a manual focus control function for manually controlling the focal point is provided along with an electronic hand movement correction function. As shown in FIG. 2, when an image pick-up apparatus 201 having a manual focus control function along with an electronic hand movement function picks up an image of a still picture, CCD 200 converts the optical image which has passed through a lens portion 211 into an electrical image signal. Then, the image signal outputted from the CCD 200 is converted into a digital signal by an analog front end 212. Further, an image signal processing unit 213 processes the image signal outputted from the analog front end 212. The image signal processed by the image signal processing unit 213 is once recorded into a memory 214, and is then displayed on a display unit 216 in accordance with a display control unit 215. The user operates a manual focus control unit 217 while observing the image displayed on the display unit 216 to thereby manually control the focal point.

Further, there are instances in which the image pick-up apparatus 201 performs an auxiliary function to enlarge the image displayed on the display unit 216 during focal point control. When the image is enlarged by the auxiliary function, a microcomputer 218 first sets an enlarged image generation region W within image generation region X as shown in FIG. 1. Further, the microcomputer 218 controls a timing generator (hereinafter referred to as TG) 219 to control the output of image signal from the CCD 200, or to control the read-out of image signal from the memory 214 so as to deliver an image signal corresponding to enlarged image generation region W to the display control unit 215. The display control unit 215 prepares an enlarged image of a predetermined size based on the delivered image signal and displays the enlarged image on the display unit 216. When the enlarged image is displayed on the display unit 216 during manual focus control, it is easier for the user to visually assess the effect of arbitrary focus control.

However, a moving picture (image) displayed on the display unit 216 is sensitive to hand movement. That is, since the image is enlarged, the image movement or shaking becomes large. Moreover, since hand movement correction is not performed when a still image is picked up, the enlarged image generation region W is set at a predetermined position even if hand movement takes place. Therefore, the image displayed in the enlarged state on the display unit 216 has large image movement or shaking and it becomes difficult for the user to observe the image displayed on the display unit 216 when performing focus control. Thus, although an enlarged image is displayed on display unit 216 for the purpose of facilitating execution of focus control, it becomes difficult for the user to perform arbitrary focus control.

Further, in the image pick-up apparatus 201, image controls such as focus control, white balance control and/or exposure control, etc. are performed on the basis of an image signal corresponding to a predetermined area of the light receiving surface of CCD 200 (hereinafter referred to as control signal generation region Z). The control signal generation region Z moves by the same distance in the same direction as that of the image generation region X. As the result of the fact that the control signal generation region Z moves by the same distance in the same direction as that of the image generation region X, the effect of hand movement on focus control, white balance control and/or exposure control, etc. is reduced.

However, in the image pick-up apparatus 201, since hand movement correction is not performed when an image of still picture is picked up, the image generation region X is not moved. Therefore, the control signal generation region Z is not moved.

Accordingly, the image signal outputted from the control signal generation region Z is corrupted by hand movement. Namely, in the image pick-up apparatus 201, since white balance control, and/or exposure control, etc. are performed on the basis of an image signal that is corrupted by hand movement, it becomes difficult to suitably perform white balance control and/or exposure control, etc. Accordingly, still picture (image) obtained by the image pick-up apparatus is corrupted.

DISCLOSURE OF THE INVENTION

The present invention has been proposed in view of the circumstances described above, and its object is to provide an image pick-up apparatus adapted for moving an image generation region in accordance with hand movement quantity to thereby perform hand movement correction, wherein when hand movement correction is not performed, arbitrary focus control can be manually performed with ease, and an image for which image controls such as white balance control and/or exposure control, etc. have been suitably performed can be picked up.

The image pick-up apparatus according to the present invention is directed to an image pick-up apparatus adapted for enlarging a predetermined region of pick-up apparatus comprising: an image pick-up device for converting optical image of object into an image signal to output the image signal; hand movement detecting means for detecting hand movement quantity, image generation region setting means for setting image generation region at the image pick-up device, enlarged image generation region setting means for setting enlarged image generation region within the image generation region; and image generating means for generating image of a predetermined size from image signal of the image generation region or the enlarged image generation region to display the image thus generated on the display unit, wherein the image generation region setting means sets image generation region within a predetermined region, the enlarged image generation region setting means sets set position of the enlarged image generation region at a position moved from a predetermined position in accordance with hand movement quantity, and the image generating means generates image enlarged so as to take a predetermined size from image signal of the enlarged image generation region to display the enlarged image on the display unit.

Accordingly, in the image pick-up apparatus according to the present invention, although image generation region is set at position moved by quantity corresponding to hand movement quantity by image generation region setting means to thereby perform hand movement correction, when image generation region setting means sets image generation region within a predetermined region and displays enlarged image with respect to the display unit, image which has been enlarged and has been caused to undergo hand movement correction can be displayed with respect to the display unit.

BRIEF DESCRIPTION OF THE DRAWINGS

FIG. 17 is a flowchart showing the operation in the case where the image pickup apparatus to which the present invention is applied performs hand movement correction when the enlargement display flag is turned ON.

BEST MODE FOR CARRYING OUT THE INVENTION

Embodiments of the present invention will now be described in detail with reference to the attached drawings.

Figure 1:
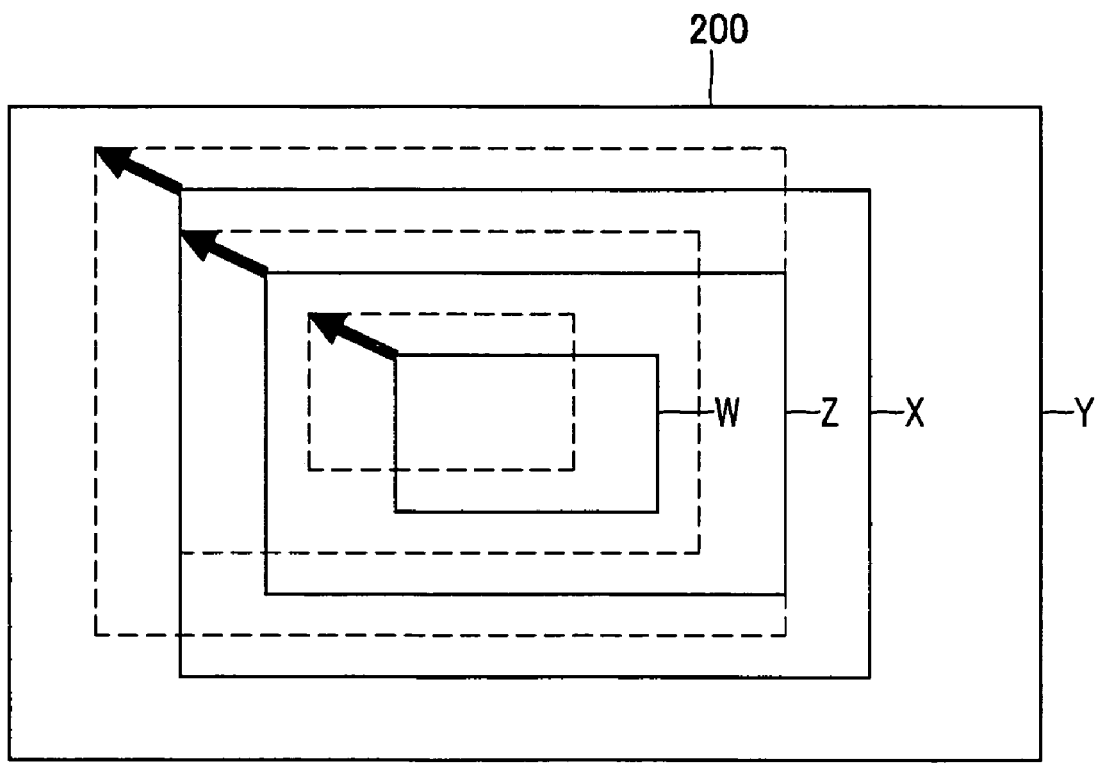
FIG. 1 is a view depicting several image regions used in a conventional image pick-up apparatus.
Figure 2:
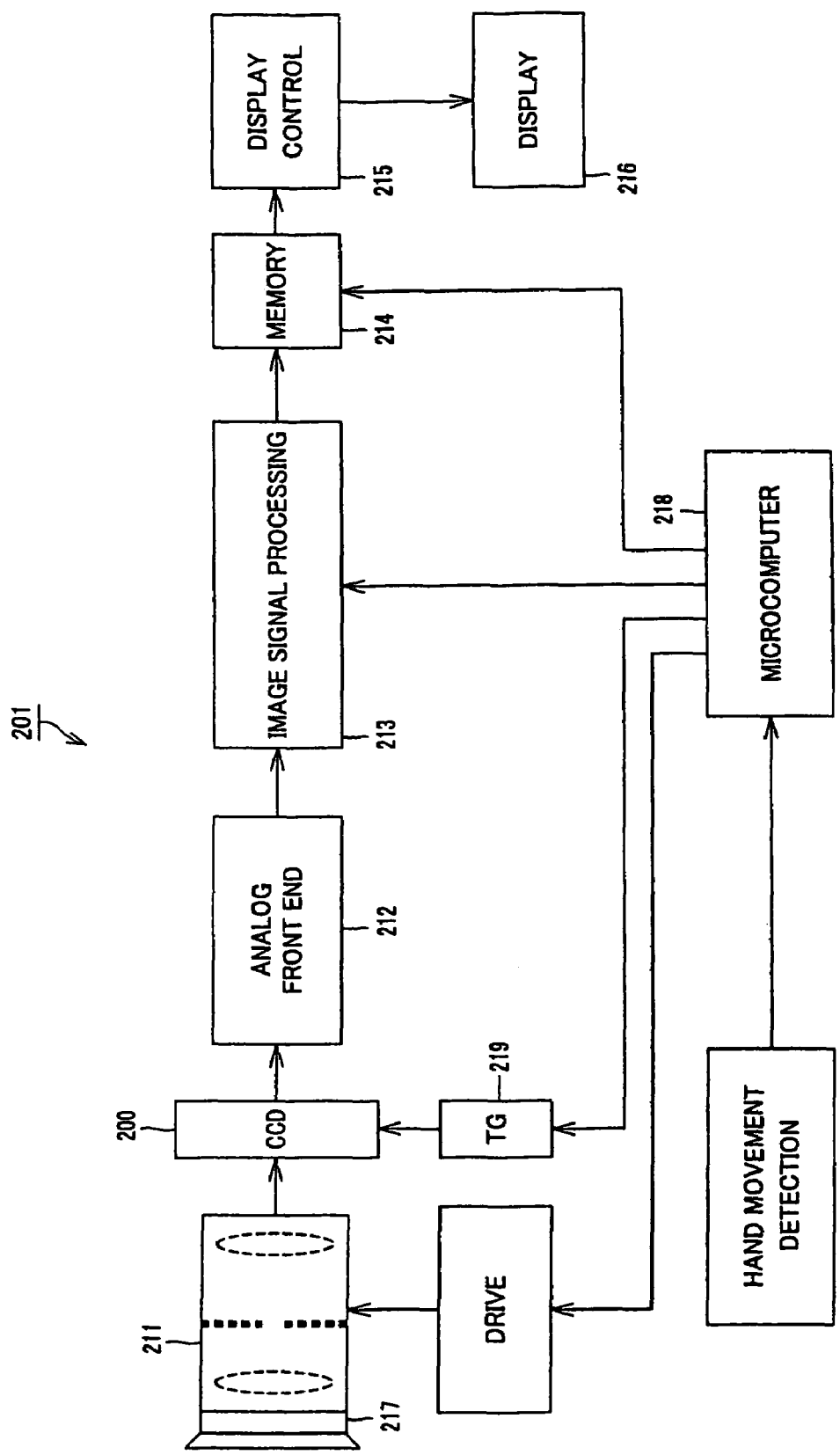
FIG. 2 is a block diagram showing the conventional image pick-up apparatus.
Figure 3:
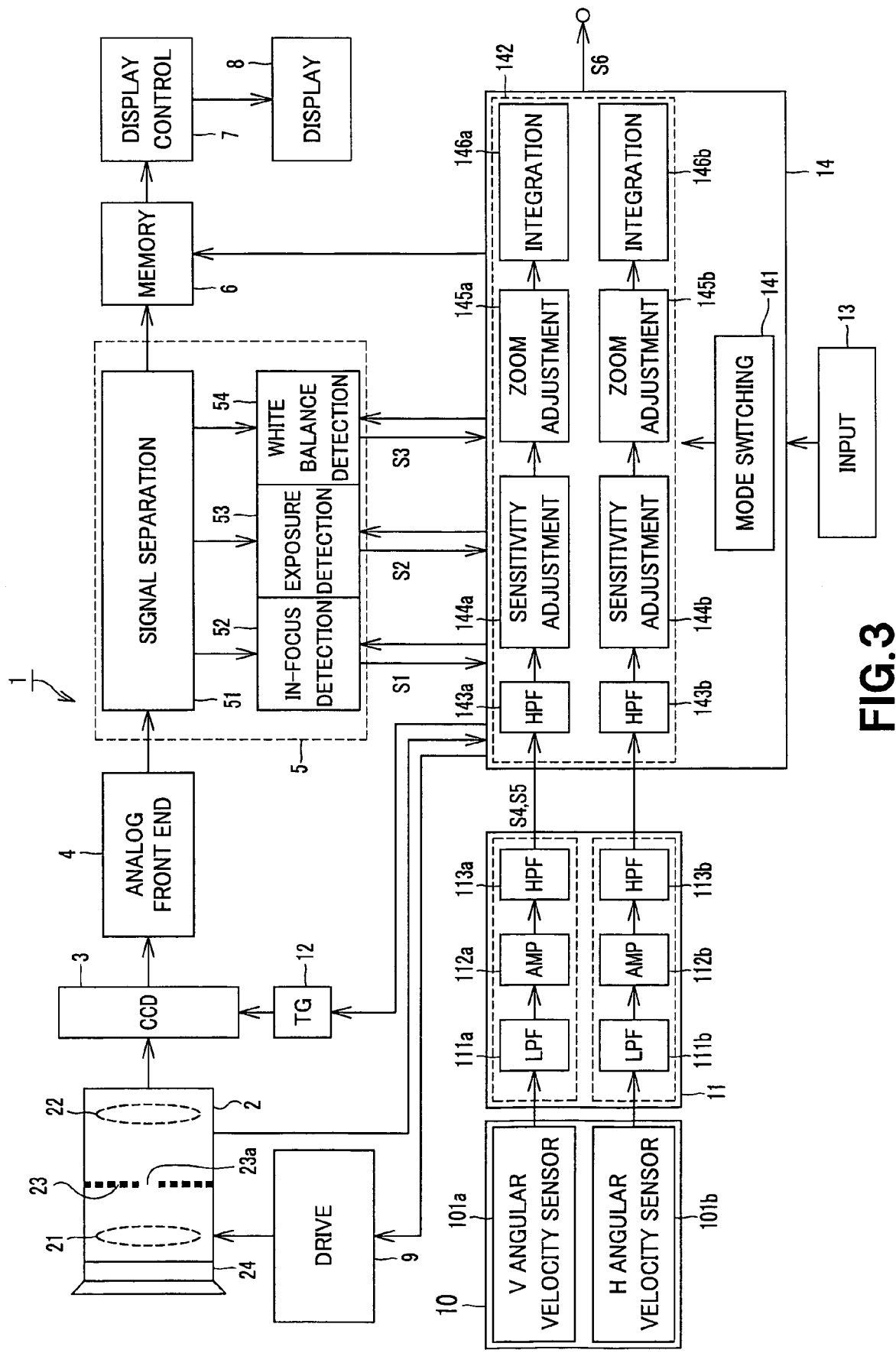
FIG. 3 is a block diagram showing an image pick-up apparatus to which the present invention is applied.

As shown in FIG. 3, an image pick-up apparatus 1 to which the present invention is applied comprises a lens unit 2 for receiving image pick-up light from an object, a CCD (Charge Coupled Device) 3 for receiving image pick-up light from the lens unit 2 and outputting an image signal, an analog front end 4 for converting the image signal outputted by the CCD 3 into a digital signal, an image signal processing unit 5 for processing the image signal outputted from the analog front end 4, a memory 6 for storing a signal delivered from the image signal processing unit 5, a display control unit 7 supplied with an image signal which has been read out from the memory 6, and a display unit 8 on which image is displayed according to the display control unit 7.

Moreover, the image pick-up apparatus 1 comprises a drive unit 9 for driving a focus lens 21, a zoom lens 22, and a stop (iris) 23 provided at the lens unit 2, an angular velocity detecting unit 10 for detecting angular velocity when hand movement or vibration takes place at the image pick-up apparatus 1 to output an angular velocity signal, an angular velocity signal processing unit 11 processing an angular velocity signal outputted from the angular velocity detecting unit 10, a timing generator (hereinafter referred to as TG) for controlling output of image signal from the CCD 3, an input unit 13 adapted so that information is inputted by user, and a microcomputer 14 for controlling respective units on the basis of signals from the image signal processing unit 5, the angular velocity processing unit 11 and the input unit 13.

At the lens unit 2, there are provided the focus lens 21 of which position is changed so that focal point can be controlled, the zoom lens 22 of which position is changed so that enlargement ratio (magnification) of image can be controlled without changing image formation position, and an aperture portion 23a of which size is adjustable (variable). The lens unit 2 comprises stop (iris) 23 adapted so that size of the aperture portion 23a is changed so that quantity of light outputted from the lens unit 2 can be controlled, and a ring 24 adapted so that it is manually rotated to thereby move position of the focus lens 21.

When the operation mode is auto focus control mode to automatically control focal point, the focus lens 21 is moved by the drive unit 9 on the basis of focus control signal S4 generated from focus detection signal S1 which will be described later. Moreover, when the operation mode is manual focus control mode to manually control focal point, the focus lens 21 is structurally moved through, e.g., link or gear, etc. by rotating the ring 24, or is moved by the drive unit 9 on the basis of rotation of the ring 24 electrically detected by using sensor such as encoder, etc. In addition, the zoom lens 22 is moved by the drive unit 9 when optical zoom is performed. The stop (iris) 23 is adapted so that size of aperture portion 23a is controlled by the drive unit 9.

It is to be noted that the image pick-up apparatus may be configures such that the zoom operation may be performed by manually moving zoom lens 22. For example, there is provided a switching unit for switching the lens moved by rotating the ring 24 into either focus lens 21 or zoom lens 22. Further, when the zoom lens 22 is manually moved, the switching unit is operated to set the lens moved by rotation of the ring 24 to the zoom lens 22 thereafter to rotate the ring 24 to thereby move the zoom lens 22. In this example, since the microcomputer 14 performs operation on the basis of position of the zoom lens 22, when the zoom lens 22 is manually moved, a signal indicating position of the zoom lens 22 is delivered to the microcomputer 14.

Figure 4:
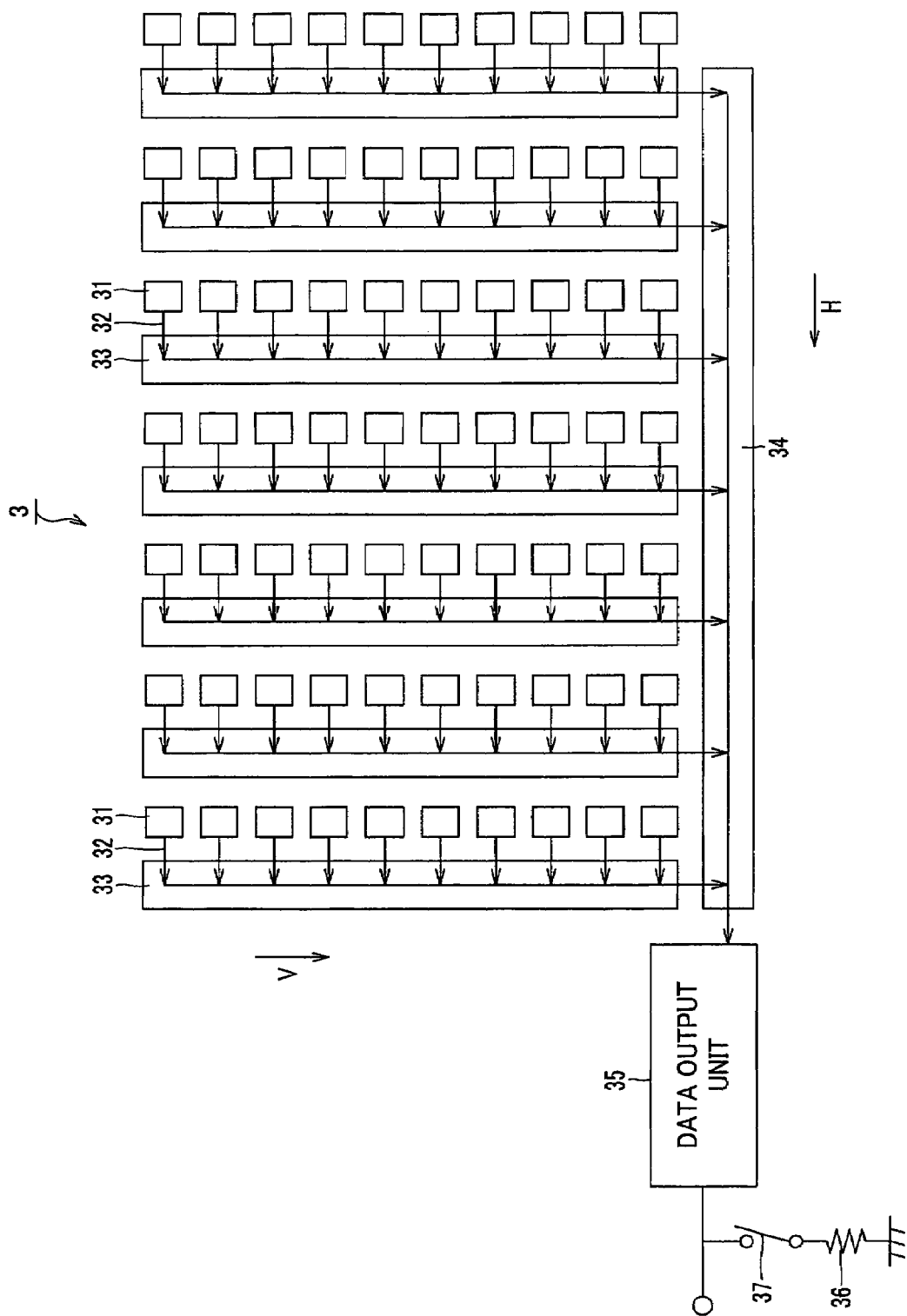
FIG. 4 is a schematic diagram showing a CCD provided at the image pick-up apparatus.

As the CCD 3, there is used, e.g., CCD of the interline transfer type as shown in FIG. 4. The CCD 3 comprises photo-diodes 31 for converting received image pick-up light into accumulated charge, read-out gates 32 from which charges accumulated in the respective photo-diodes 31 are read out, vertical transfer paths 33 for transferring, in a vertical direction indicated by arrow V in the figure, charges which have been read out (hereinafter referred to as vertical transfer), a horizontal transfer path 34 for transferring, in a horizontal direction indicated by arrow H in the figure, charges which have been transferred in vertical direction (hereinafter referred to as horizontal transfer), a data output unit 35 for performing amplification of charges which have been transferred in horizontal direction, etc., a grounded resistor 36, and a switch 37 provided between the data output unit 35 and the resistor 36. Namely, when the switch 37 is turned ON (closed), the data output unit 35 is grounded through the resistor 36 so that no charge is outputted. In addition, when the switch 37 is turned OFF (opened), the data output unit 35 outputs charges. Accordingly, when the switch 37 is turned ON, no image signal is outputted from the CCD 3. When the switch 37 is turned OFF, an image signal is outputted from the CCD 3. Read-out, vertical transfer and horizontal transfer of charges accumulated at the respective photo-diodes 31, and ON/OFF of the switch 37 are performed on the basis of signals delivered from the TG 12.

The image signal processing unit 5 comprises a signal separation unit 51 for separating an image signal delivered from the analog front end 4 into a luminance signal, an R-signal, a G-signal and a B-signal (hereinafter collectively referred to as color signals), an in-focus detecting unit 52 for detecting in focus degree of the lens unit 2 from luminance signal in accordance with control by the microcomputer 14, an exposure detecting unit 53 for detecting brightness of object from luminance signal in accordance with control by the microcomputer 14, and a white balance detecting unit 54 for detecting color temperature of object from color signals in accordance with control by the microcomputer 14.

Figure 5:
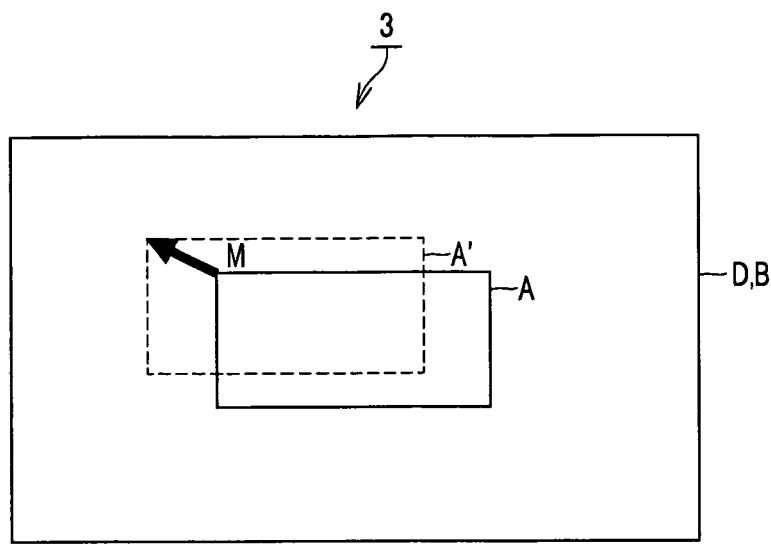
FIG. 5 is a view depicting an image generation region and a control signal generation region during a still picture image pick-up mode and an auto focus control mode.
Figure 6:
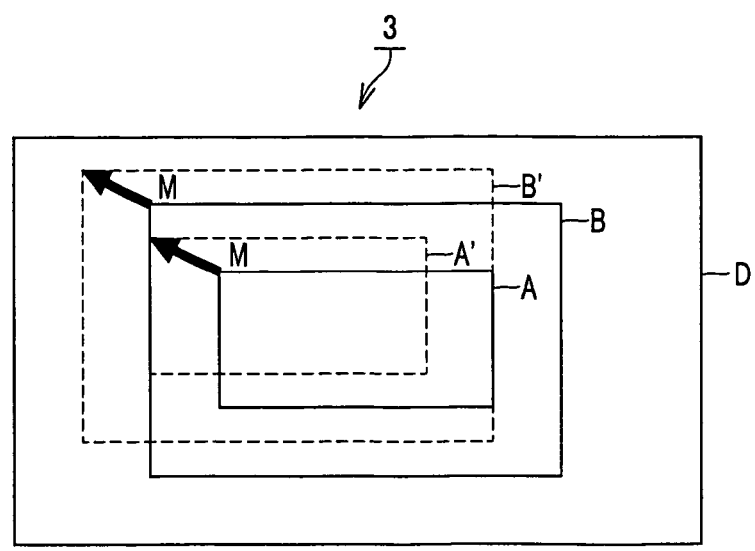
FIG. 6 is a view depicting the setting of an image generation region and a control signal generation region during a moving picture image pick-up mode and an auto-focus control mode.

The in focus detecting unit 52 is operative so that when the operation mode is auto-focus control mode, it integrates, by control of the microcomputer 14, high frequency component of a luminance signal that is separated from image signal outputted from control signal generation region A set at the light receiving surface of the CCD 3, as shown in FIGS. 5 and 6, for example, to generate focus detection signal S1 indicating in focus degree of the lens unit 2. The focus detection signal S1 is delivered to the microcomputer 14. Since high frequency component of luminance signal increases according as the lens unit 2 is placed in in-focus state to more degree, the focus detection signal S1 increases. The high frequency component of the luminance signal is obtained, e.g., by passing luminance signal through high-pass filter or band-pass filter. In this example, the control signal generation region A is set at the light receiving surface of the CCD 3 by the microcomputer 14. Setting of the control signal generation region A by the microcomputer 14 will be described later.

Figure 7:
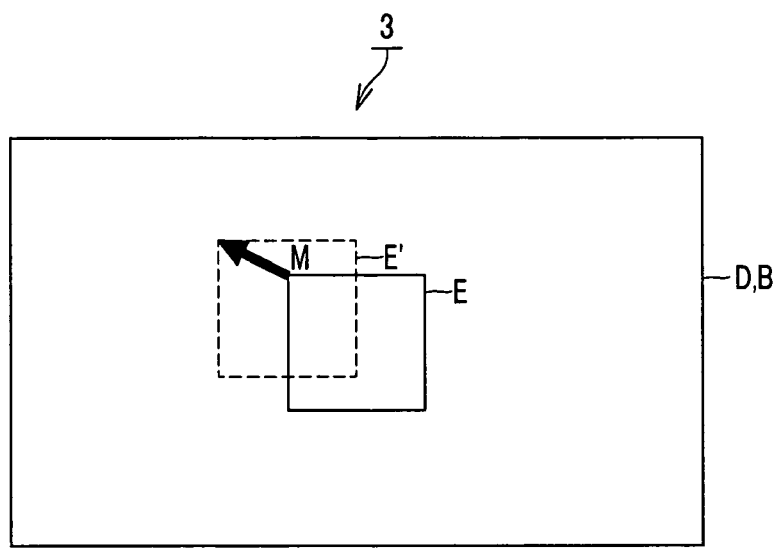
FIG. 7 is a view depicting the setting of an image generation region and an enlarged signal generation region during a still picture image pick-up mode and a manual focus control mode.
Figure 8:
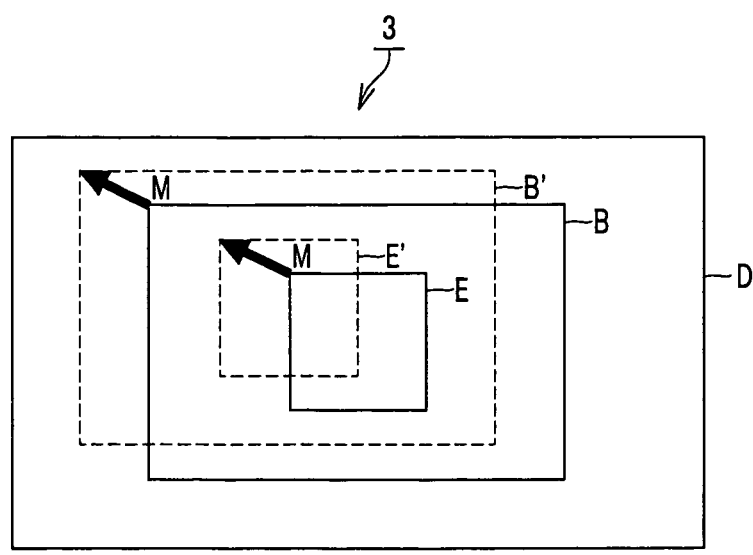
FIG. 8 is a view depicting the setting of an image generation region and an enlarged image generation region during a moving picture image pick-up mode and a manual focus control mode.

The exposure detecting unit 53 is operative so that when the operation mode is auto focus control mode, it integrates, by control of the microcomputer 14, luminance signal separated from image signal outputted from the control signal generation region A to generate exposure detection signal S2 indicating brightness of object. Moreover, the exposure detecting unit 53 is operative so that when the operation mode is manual focus control mode, it integrates, by control of the microcomputer 14, a luminance signal that is separated from image signal outputted from enlarge image generation region E set at the light receiving surface of the CCD 3, as shown in FIGS. 7 and 8, for example, to generate exposure detection signal S2. The exposure detection signal S2 is delivered to the microcomputer 14. Since the value of the luminance signal increases as object becomes bright, the exposure detection signal S2 also increases as the object becomes bright. In this example, enlarged image generation region E is set at the light receiving surface of the CCD 3 by the microcomputer 14. Setting of the enlarged image generation region E by the microcomputer 14 will be described later.

The white balance detecting unit 54 is operative so that when the operation white balance detection signal S3 indicating color temperature of object on the basis of color signals separated from image signal outputted from the control signal generation region A. Moreover, the white balance detecting unit 54 is operative so that when the operation mode is manual focus control mode, it generates, by control of the microcomputer 14, white balance detection signal S3 from image signal outputted from the enlarged image generation region E. The white balance detection signal S3 is delivered to the microcomputer 14. The white balance detection signal S3 is generated by integrating signals including color information of R-signal and B-signal.

The display control unit 7 converts an image signal which has been read out from the memory 6 into data train representative of an image that the display unit 8 can display on the display unit 8. Moreover, for example, when the operation mode is manual focus control mode and setting such that the auxiliary function is used is made, etc., image signal outputted from a portion of effective pixels of the CCD 3 is delivered from the memory 6. When the system is set such that an enlarged image is displayed on the display unit 8, the display control unit 7 converts the image signal which has been read out from the memory 6 into a data train representative of an image that the display unit 8 can display as an enlarged image of predetermined size.

For example, when the operation mode is manual focus mode and setting is made, image signal of the enlarged image generation region E is read out from the memory 6. The display control unit 7 converts image signal of the enlarged image generation region E into data train that the display unit 8 can display as image having a predetermined size to display the enlarged image on the display unit 8.

The display unit 8 displays image in accordance with control from the display control unit 7. For example, when the operation mode is auto focus adjustment mode, the display unit 8 displays image generated from image signal outputted from image generation region B. Moreover, when the operation mode is manual focus control mode, and setting such that auxiliary function is used is made to perform focus control, the display unit 8 displays image generated from image signal outputted from the enlarged image generation region E.

When the operation mode is auto focus control mode, the drive unit 9 moves the focus lens 21 on the basis of focus control signal S4 delivered from the microcomputer 14 to control focal point of image. Moreover, when the optical zoom is performed, the drive unit 9 moves the zoom lens 22 on the basis of enlargement ratio (magnification) control signal delivered from the microcomputer 14 to adjust enlargement ratio (magnification) of image. Further, the drive unit 9 changes size of aperture portion 23a provided at stop (iris) 23 on the basis of exposure control signal S5 delivered from the microcomputer 14 to adjust quantity of light that the lens unit 2 outputs.

The angular velocity detecting unit 10 detects angular velocity when hand movement takes place at the image pick-up apparatus 1. The angular velocity detecting unit 10 comprises a V-direction angular velocity sensor 101a for detecting angular velocity in the vertical direction to output a vertical (V) angular velocity signal, and an H-direction angular velocity sensor 101b for detecting angular velocity in the horizontal direction to output a horizontal (H) angular velocity signal.

The angular velocity signal processing unit 11 comprises low-pass filters 111a, 111b for removing high frequency component from V-angular velocity signal and H-angular velocity signal which have been outputted by the angular velocity detecting unit 10, amplifiers 112a, 112b for amplifying signals outputted by the low-pass filters 111a, 111b, and high-pass filters 113a, 113b for removing low frequency component from signals outputted by the amplifiers 112a, 112b. Namely, the angular velocity signal processing unit 11 performs band limitation and amplification of the H-angular velocity signal and V-angular velocity signal.

The TG 12 delivers a signal to the CCD 3 to control output of image signal from the CCD 3. When described in detail, the TG 12 delivers, to the CCD 3, readout signal VT for reading out charges accumulated in respective photo-diodes 31, ordinary vertical transfer signal VLC for performing, at ordinary speed (frequency), vertical transfer of signal which has been read out, high speed vertical transfer signal VHC for performing, at high speed, vertical transfer of signal which ordinary speed, horizontal transfer of signal which has been transferred in vertical direction, high speed horizontal transfer signal HHC for performing, at high speed, horizontal transfer of signal which has been transferred in vertical direction, and a switch signal SP for turning the switch 37 ON.

When the TG 12 delivers read-out signal VT to the CCD 3 thereafter to deliver ordinary vertical transfer signal VLC and ordinary horizontal transfer signal HLC, image signal is outputted from the CCD 3. On the other hand, when the TG 12 delivers read-out signal VT to the CCD 3 thereafter to deliver high speed vertical transfer signal VHC, high speed transfer signal HHC and switch signal SP, charges accumulated in respective photo-diodes 31 are transferred in vertical direction at high speed, and are then transferred in horizontal direction at high speed. The charges thus transferred are delivered to the data output unit 35. In addition, since the switch 37 is turned ON, the data output unit 35 is grounded through a resistor 36. As a result, charges transferred at high speed are not outputted from the data output unit 35. Namely, no image signal is outputted from the CCD 3.

The input unit 13 comprises a mode switching dial, zoom button and/or capture button, etc. When user operates the input unit 13, switching between still picture image pick-up mode and moving picture image pick-up mode, setting of enlargement ratio (magnification) of image, switching between manual focus etc. are performed.

The capture button is caused to be of the configuration in which it is pushed or thrust thereinto at two stages. The state where the capture button is lightly pushed so that it is pushed or thrust into the position at which user feels resistance is called "half-push", and the state where the button is further pushed or thrust from the "half-push" is called "full-push". When the capture button is placed in "half-push" state, image displayed on the display unit 8 becomes stationary (still). When the capture button is placed in full-push state, image displayed on the display unit 8 is picked up as still picture (image), and is recorded at recording portion (not shown).

Setting such that auxiliary function is used is made when the operation mode is the manual focus control mode so that an enlarged image is displayed on the display unit 8 when user is rotating the ring 24. Namely, when user manually controls the focal point, he can perform focus control while observing the enlarged image displayed on the display unit 8. Moreover, at the image pick-up apparatus 1, when the operation mode is manual focus control mode and setting such that auxiliary function is used is made so that focus control is being performed, image which has been enlarged and has been caused to undergo hand movement correction is displayed on the display unit 8.

In this example, in the case where the operation mode is manual focus control mode, display of enlarged image is completed when a predetermined time t is passed from the time when rotation of the ring 24 is stopped. The time t is measured by counter (not shown) provided at the microcomputer. It is to be noted that even in the case where the operation mode is manual focus control mode and user is rotating the ring 24, when setting such that auxiliary function is not used is made, ordinary image which is not enlarged is displayed on the display unit 8.

The microcomputer 14 comprises a mode switching unit 141. When still picture (image) pick-up mode is selected through input unit 13 the mode switching unit sets the system to operate in still picture pick-up mode. When moving picture (image) pick-up mode is selected through input unit 13 the mode switching unit sets the system to operate in moving picture pick-up mode. Moreover, when setting for manually controlling focal point is made by the input unit 13, the operational mode is the manual focus control mode. When setting for automatically controlling focal point is made, the operational mode is the auto focus control mode.

The microcomputer 14 comprises a hand movement quantity calculation unit 142 for determining hand movement quantity indicating direction and/or magnitude of hand movement when hand movement takes place at the image pick-up apparatus 1. The hand movement quantity calculation unit 142 comprises a high-pass filter (HPF) 143*a* supplied with V angular velocity signal outputted from the angular velocity signal processing unit 11, a sensitivity adjustment section 144*a* supplied with a signal outputted from the high-pass filter 143*a*, a zoom adjustment section 144*x*, and an integration circuit 146*a* supplied with a signal outputted from the zoom adjustment section 145*a*. Moreover, the hand movement calculation unit 142 comprises a high-pass filter (HPF) 143*b* supplied with a H angular velocity signal outputted from the angular velocity signal processing unit 11, a sensitivity adjustment section 144*b* supplied with a signal outputted from the high-pass filter 143*b*, a zoom adjustment section 145*b* supplied with a signal outputted from the sensitivity adjustment section 144*b*, and an integration circuit 146*b* supplied with a signal outputted from the zoom adjustment section 145*b*.

The high-pass filters 143*a*, 143*b* remove low frequency components included in V angular velocity signal and H angular velocity signal which have been respectively delivered from the angular velocity signal processing unit 11 to thereby avoid that movement of the image pick-up apparatus 1 by panning or tilting is included into hand movement quantity calculated by the hand movement quantity calculation unit 142 so that erroneous hand movement correction is made.

The sensitivity adjustment sections 144*a*, 144*b* perform, with respect to signals outputted from the high-pass filters 143*a*, 143*b*, an operation for reducing unevenness of individual sensitivities of the H angular velocity sensor 101 a and the V angular velocity sensor 102*b* provided at the image pick-up apparatus 1.

Figure 9:
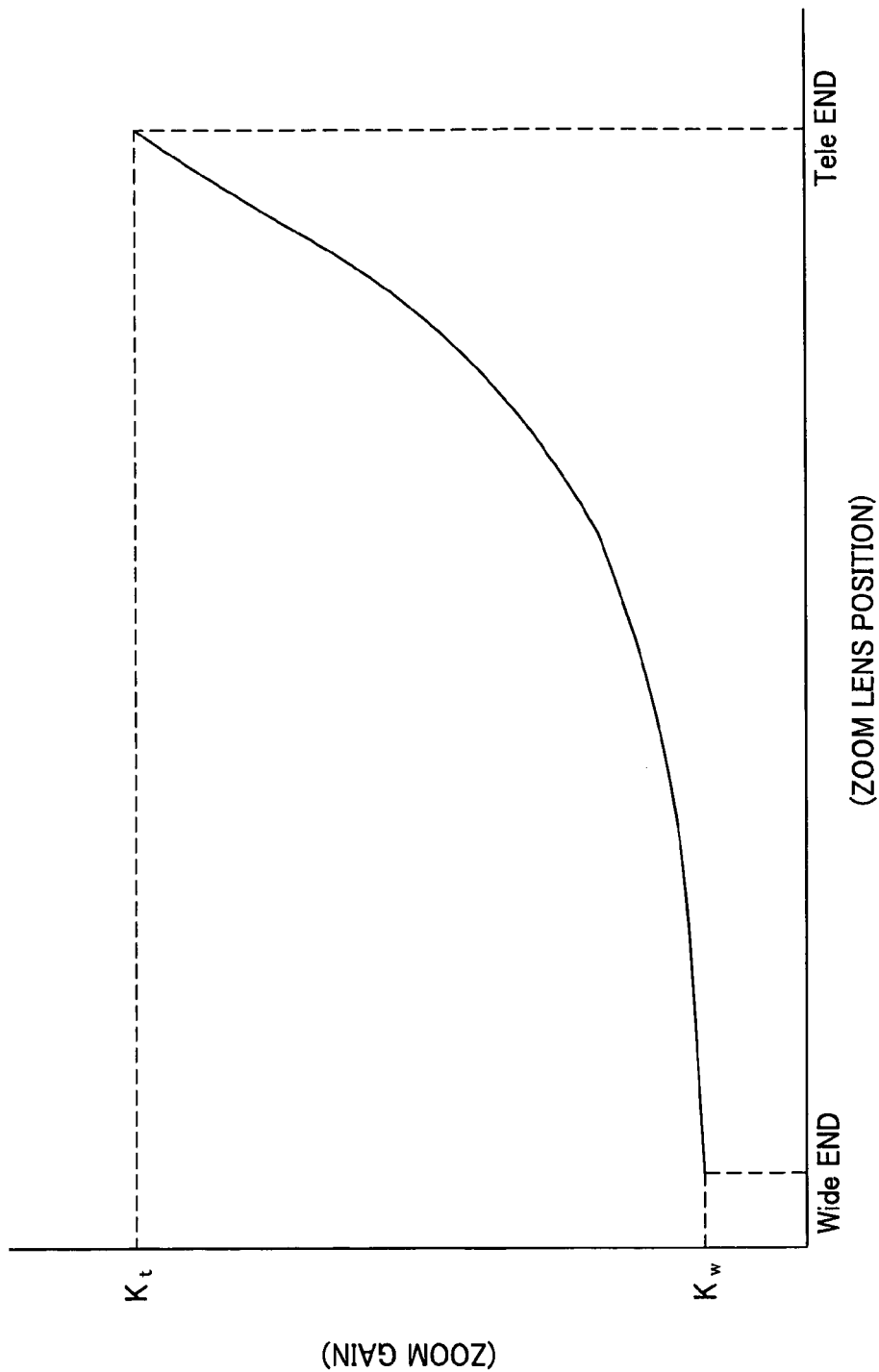
FIG. 9 is a graph showing a gain characteristic used in a zoom adjustment unit.

The zoom adjustment sections 145*a*, 145*b* perform correction corresponding to position of the zoom lens 22 with respect to signals outputted apparatus 1, when position of the zoom lens 22 is varied to change enlargement ratio (magnification) of image, image movement or shaking changes also when similar hand movement takes place. Accordingly, e.g., the gain table shown in FIG. 9 is used to determine zoom gain from position of the zoom lens 22 to integrate the zoom gain with respect to signals delivered from the sensitivity adjustment sections 144*a*, 144 to thereby perform correction. In FIG. 9, the abscissa indicates position of the zoom lens 22, and the ordinate indicates zoom gain. The zoom gain becomes large according as position of the zoom lens 22 moves from the Wide end and the Tele end.

The integration circuits 146*a*, 146*b* implement integration to signals outputted from the zoom adjustment sections 145*a*, 145*b* to thereby calculate angle. A hand movement is calculated from the angle calculated by the integration circuits 146*a*, 146*b*.

The microcomputer 14 generates exposure control signal S5 on the basis of exposure detection signal S2 delivered from the exposure detecting unit 53 to deliver it to the drive unit 9. Moreover, the microcomputer 14 generates white balance amplifier control signal S6 on the basis of white balance detection signal S3 delivered from the white balance detecting unit 54 to deliver it to white balance amplifier (not shown) which amplifies or attenuates color signal into a predetermined value 14 generates focus control signal S4 on the basis of focus detection signal S1 delivered from the in focus detecting unit 52 to deliver it to the drive unit 9.

When the operation mode is moving picture image pick-up mode, the microcomputer 14 sets, as shown in FIGS. 6 and 8, image generation region B within region constituted by all effective pixels (hereinafter referred to as effective pixel region) of the CCD 3. The microcomputer 14 serves to move set position of the image generation region B in accordance with hand movement quantity to thereby perform hand movement correction of image displayed on the display unit 8. When the operation mode is moving picture image pick-up mode and hand movement quantity is equal to zero, the microcomputer 14 sets the image generation region B at a predetermined position indicated by B in FIGS. 6 and 8. Further, when, e.g., hand movement quantity indicated by arrow M in the figure is detected, the microcomputer 14 sets the image generation region B at position B' moved by quantity corresponding to hand movement quantity from the predetermined position B.

Namely, the image pick-up apparatus 1 performs hand movement correction by the so-called electronic hand movement correction system to move the position of image generation region B set within effective pixel region D by a quantity corresponding to hand movement quantity to thereby correct image movement or shaking.

Moreover, when the operation mode is still picture image pick-up mode, the microcomputer 14 serves to set the image generation region B at a predetermined position irrespective of hand movement quantity as shown in FIGS. 5 and 7. In this embodiment, the entirety of the effective pixel region D of the CCD 3 is set within the image generation region B.

When the operation mode is manual focus control mode, the microcomputer 14 serves to set an enlarged image generation region E within the image generation region B as shown in FIGS. 7 and 8. The microcomputer 14 serves to move the set position of the enlarged image generation region E in accordance with the hand movement quantity to thereby perform hand movement correction of the image displayed in the enlarged state on the display unit 8. When the hand movement quantity is equal to zero, the enlarged image generation region E is set at a predetermined position as indicated by E in FIGS. 7 and 8, for example. Further, when hand movement quantity as indicated by arrow M in the figure, for example, is detected, the enlarged image generation region is set at a position E' moved by quantity corresponding to hand movement quantity from the predetermined position E.

As explained above, the enlarged image generation region E is set, whereby when the operation mode is manual focus control mode, image which has been enlarged and has been caused to undergo hand movement correction is displayed on the display unit 8. Accordingly, in accordance with the image pick-up apparatus 1, user makes it easy to perform arbitrary focus control. Moreover, the resulting has undergone auto focus control, exposure control and white balance control based on data which has been corrected for hand movement. Namely, the image pick-up apparatus 1 can pick up still picture (image) in which exposure and/or white balance, etc. have been suitably performed.

When the operation mode is auto focus control mode, the microcomputer 14 sets, as shown in FIGS. 5 and 6, control signal generation region A within image generation region B. The microcomputer 14 serves to move set position of the control signal generation region A in accordance with hand movement quantity, whereby image signal outputted from the control signal generation region A results in image which has been caused to undergo hand movement correction. When the hand movement quantity is equal to zero, the control signal generation region A is set at a predetermined position as indicated by A in FIG. 5, for example. Further, when, e.g., hand movement quantity as indicated by arrow M in the figure is detected, the control signal generation region is set at a position X moved by quantity corresponding to hand movement quantity from the predetermined position A.

As explained above, the control signal generation region A is set on the basis of hand movement quantity, whereby even when the operation mode is auto focus control mode and hand movement correction is not implemented to image to be displayed on the display unit 8, picked up image results in image in which auto the basis of image signal having less influence of hand movement. Namely, the image pick-up apparatus 1 can pick up still picture (image) in which exposure and/or white balance, etc. have been suitably performed.

The microcomputer 14 controls the TG 12 to output, from the CCD 3, image signals except for image signals outputted from excess pixels positioned at both end sides in the vertical direction. Moreover, the microcomputer 14 controls address of image signal which is read out from the memory 6 to read out, from the memory 6, image signals except for image signals outputted from excess pixels positioned at both end sides in the horizontal direction.

Figure 10:
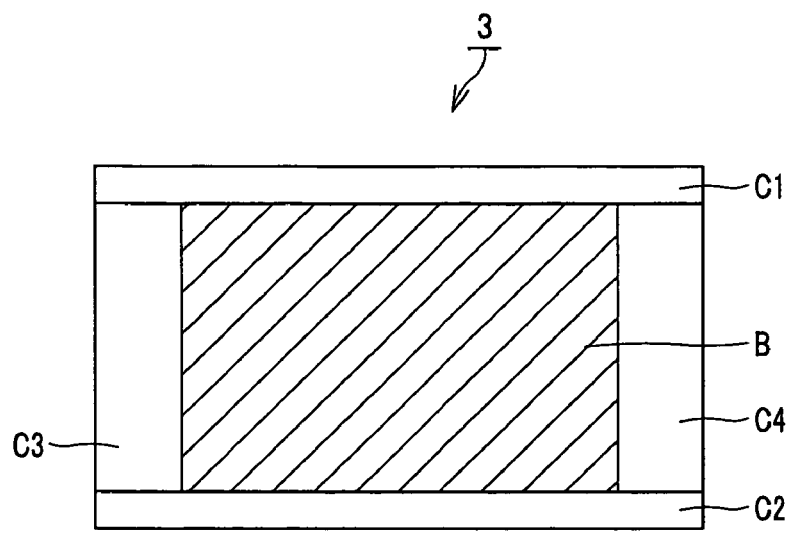
FIG. 10 is a view depicting the relationship between an image signal portion removed by controlling a CCD output and image signal portion removed by controlling read-out from a memory.

When the image generation region B is set as indicated by slanting lines in FIG. 10 in the case where the operation mode is moving picture image pick-up mode, the microcomputer 14 inhibits that charges accumulated at surplus photo-diodes 31 positioned at both end sides in the vertical direction as indicated by C1 and C2 are outputted from the data output unit 35 by suitably delivering high speed vertical transfer signal VHC, high speed horizontal transfer signal HHC and switch signal SP. On the other hand, charges accumulated at the photo-diodes 31 existing within the range except for C1 and C2 are outputted from the data output unit 35 by delivering ordinary vertical transfer signal VLC and ordinary horizontal transfer signal HLC. Accordingly, image signals within the range except for C1 and C2 are outputted. The image signal outputted from the CCD 3 is processed by the image signal processing unit 5, and is then recorded into the memory 6. Then, the microcomputer 14 controls address of image signal which is read out from the memory 6 on the basis of hand movement quantity to read out, from the memory 6, image signals except for image signals outputted from excess pixels positioned at both end sides in the horizontal direction as indicated by C3 and C4 to deliver such image signals to the display control unit 7. That is, when the operation mode is moving picture image pick-up mode, the microcomputer 14 reads out, from the memory 6, image signals within the range of the image generation region B without reading out, from the memory 6, image signals within the range as indicated by C3 and C4 to deliver such images signal to the display control unit 7.

On the other hand, when the operation mode is the still picture image pick-up mode and the auto focus control mode, the microcomputer 14 controls the TG 12 to output, from the data output unit 35, charges accumulated in photo-diodes within the effective pixel region D by delivering the ordinary vertical transfer signal VLC and the ordinary horizontal transfer signal HLC. Accordingly, image signal of the effective pixel region D is outputted from the CCD 3. The image signal outputted from the CCD 3 is processed by the image signal processing unit 5, and is then recorded into the memory 6. Further, the microcomputer 14 reads out all image signals recorded in the memory 6 to deliver them to the display control unit 7.

Figure 11:
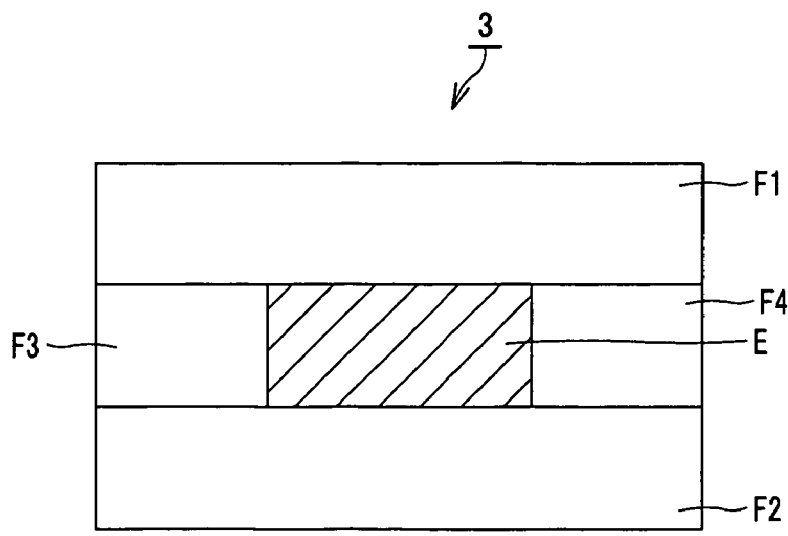
FIG. 11 is a view used in explaining how image signal portions that are not to be displayed during enlarged image display are discarded by controlling a CCD output operation and controlling a memory read-out operation.

Moreover, when the enlarged image generation region E is set as indicated by slanting lines in FIG. 11 in the case where the operation mode is a manual focus mode photo-diodes 31 positioned at both end sides in vertical direction as indicated by F1 and F2 are outputted from the data output unit 35 by delivering high speed vertical transfer signal VHC, high speed horizontal transfer signal HHC, and switch signal SP. On the other hand, the microcomputer 14 outputs, from the data output unit 35, charges accumulated in photo-diodes 31 existing within the range except for F1 and F2 by delivering ordinary vertical transfer signal VLC and ordinary horizontal transfer signal HLC. Accordingly, image signals within the range of F1 and F2 are not outputted from the CCD 3. The image signals outputted from the CCD 3 are processed by the image signal processing unit 5, and are then recorded into the memory 6. Then, the microcomputer 14 controls, on the basis of hand movement quantity, address of image signal which is read out from the memory 6 to read out, from the memory 6, image signals except for image signals outputted from excess pixels positioned at both sides in the horizontal direction as indicated by F3 and F4. Namely, the microcomputer 14 reads out, from the memory 6, image signals within the range of the enlarged image generation region E without reading out, from the memory 6, image signals within the range indicated by F3 and F4 to deliver them to the display control unit 7.

Namely, when the operation mode is moving picture image pick-up mode and auto focus control mode, the microcomputer 14 serves to move, as shown in FIG. 6, control signal generation region A and image generation region B by quantity corresponding to hand movement quantity indicated by arrow M.

Moreover, when the operation mode is still picture image pick-up mode and auto focus control mode, the microcomputer 14 serves to set, as shown in FIG. 5, image generation region B to full effective pixels to move the control signal generation region A by quantity corresponding to hand movement quantity indicated by arrow M. Further, when the operation mode is moving picture image pick-up mode and manual focus adjustment mode, the microcomputer 14 serves to moves, as shown in FIG. 8, the image generation region B and the enlarged image generation region E by quantity corresponding to hand movement quantity indicated by arrow M. In addition, when the operation mode is still picture image pick-up mode and manual focus adjustment mode, the microcomputer 14 sets, as shown in FIG. 7, image generation region B to full effective pixels to move the enlarged image generation region E by quantity corresponding to hand movement quantity indicated by arrow M.

When the operation mode is manual focus adjustment mode and setting such that auxiliary function is used is made, the microcomputer 14 delivers image signal of the enlarged image generation region E to the display control unit 7. The display control unit 7 generates image enlarged so as to take a predetermined size from image signal of the enlarged image generation region E. Namely, when the operation mode is manual focus adjustment mode and setting such that auxiliary function is used is made, image which has been enlarged and has been caused to undergo hand movement correction is displayed on the display unit 8. Accordingly, since user can manually perform focus control while visually recognizing image which has been enlarged and has been caused to undergo hand movement correction, it becomes easy to perform arbitrary focus control.

Moreover, when image which has been generated and enlarged on the basis of image signal of enlarged image generation region E is displayed on the display unit 81 the microcomputer 14 turn ON flag to the effect that enlarged image is displayed (hereinafter refereed to as enlargement display flag). When the enlargement display flag is turned ON, the microcomputer 14 serves to move position of the enlarged image generation region E by quantity corresponding to hand movement quantity to display, on the display unit 8, image which has been enlarged and has been caused to undergo hand movement correction.

Figure 12:
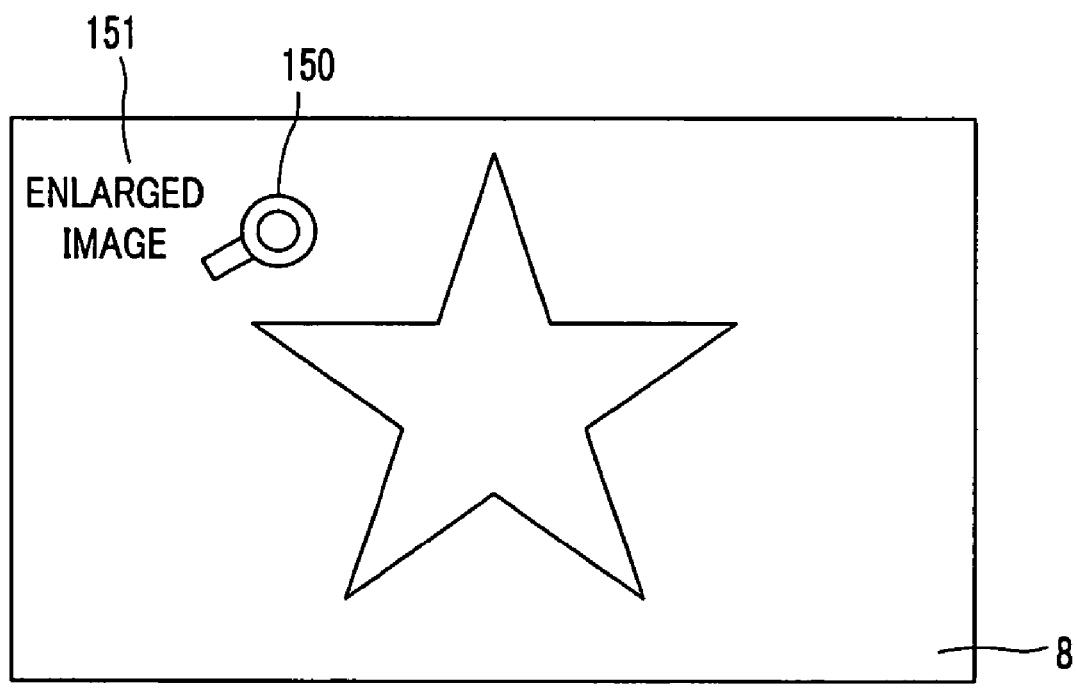
FIG. 12 depicts a display in a state in which an icon is displayed on display unit when an image is displayed in an enlarged state on the display unit.

It is to be noted that in the case where the operation mode is a manual focus mode and an enlarged image is displayed on the display unit 8, if the user is not observing the display at the moment when the image is enlarged it is difficult for the user to judge whether or not the displayed image is enlarged. As shown in FIG. 12, there is conceived a method of performing judgment to the effect that enlarged image is displayed, by displaying icon 150 or character 151 when enlarged image is displayed on the display unit 8. However, when such a method is employed, a portion of image is hidden by display of icon 150 or character 151. This prevents that user visually recognizes image when he manually controls focal point.

Figure 13A:
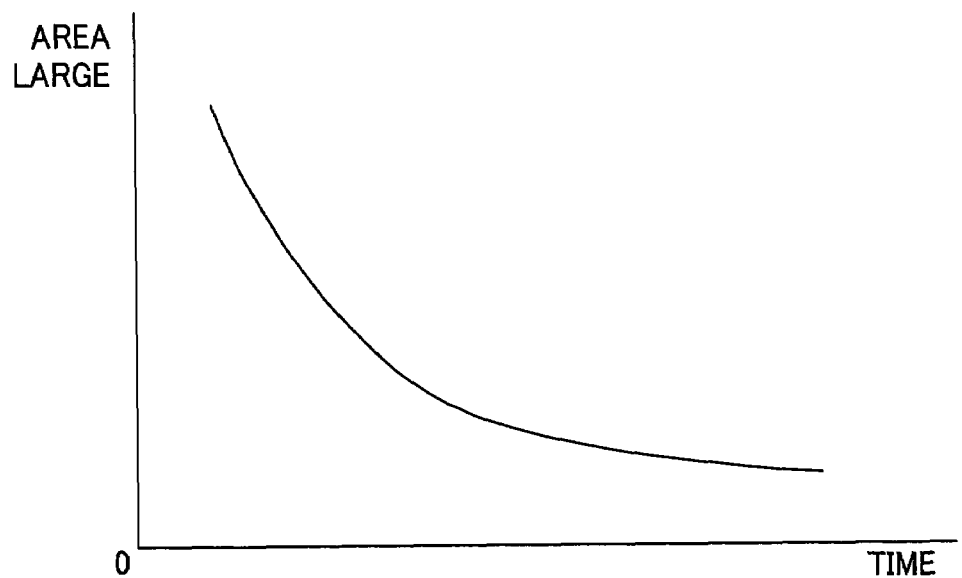
FIGS. 13A and 13B are views showing states in which an area of an enlarged image generation region gradually becomes narrow, and the degree of enlargement gradually increases with the lapse of time.
Figure 13B:
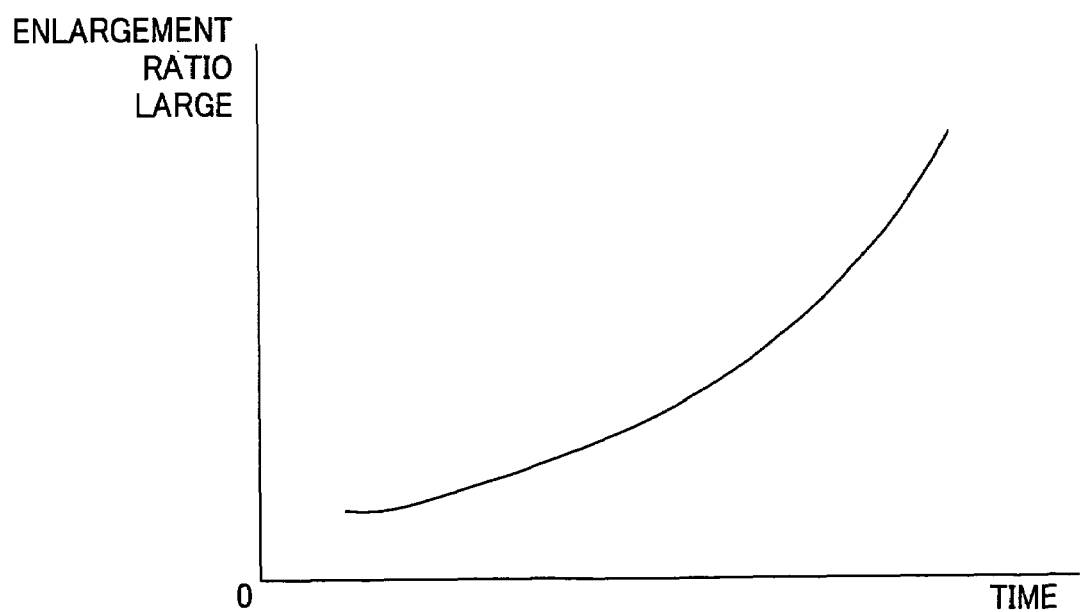

In view of the above, at the microcomputer 14, it is preferable that made such that when image displayed on the display unit 8 is enlarged, the enlarged image generation region E gradually becomes narrow with lapse of time as shown in FIG. 13A, for example. Area of enlarged image generation region E is gradually narrowed with lapse of time so that enlargement ratio of image displayed on the display unit 8 gradually increases with lapse of time as shown in FIG. 13B, for example. By displaying image on the display unit 8 while gradually increasing enlargement ratio, user becomes easy to recognize that enlarged image is displayed on the display unit 8.

Figure 14A:
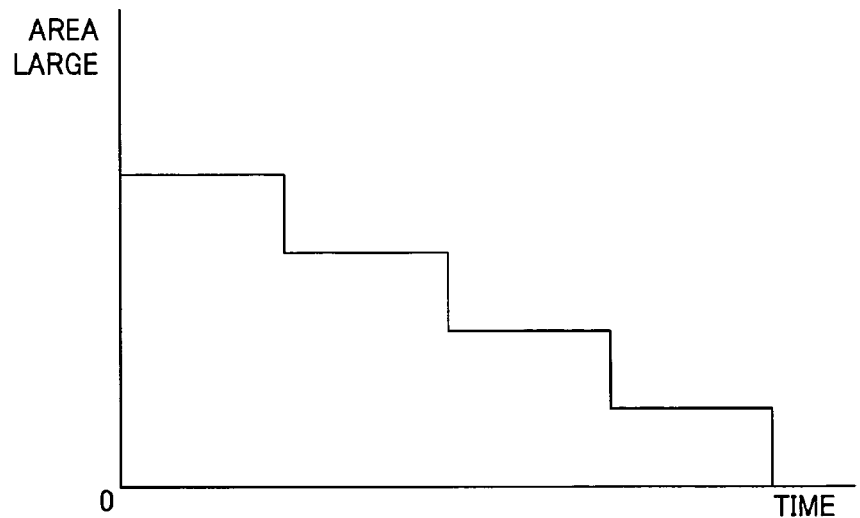
FIGS. 14A and 14B are views showing the state where the area of enlarged image generation region discretely becomes narrow, and the enlargement ratio of image displayed on display unit discretely increases with the lapse of time.
Figure 14B:
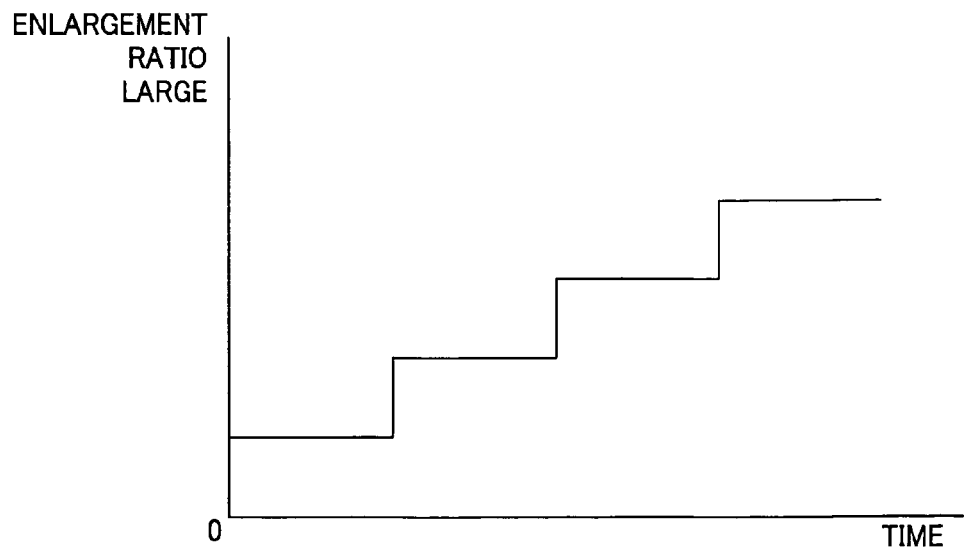

Moreover, in the case where image is displayed on the display unit 8 while gradually increasing enlargement ratio when the operation mode is manual focus control mode, it becomes difficult to perform discrimination between such display and display when image enlarged by zoom operation is displayed on the display unit 8. In view of the above, at the microcomputer 14, it is further preferable that when the operation mode is manual focus control mode, setting is made such that area of the enlarged image generation region E discretely becomes small with lapse of time as shown in FIG. 14A, for example. When setting is made such that area of the enlarged image generation region E discretely becomes small with lapse of time, enlargement ratio of image displayed on the display unit 8 discretely increases with lapse of time as shown in FIG. 14B, for example. By discretely increasing enlargement ratio of image with lapse of time, user can judge that enlarged image is displayed on the display unit 8 because the operation mode is manual focus control mode. It is to be noted that there may be employed an approach to change center position of enlarged image generation region E every time enlargement ratio of image changes when enlargement ratio of image is discretely increased.

As a method of reducing area of the enlarged image generation region E with lapse of time, there is mentioned, e.g., a method of storing table or function indicating the relationship between time and enlarged image generation region E into memory unit (not shown), whereby the microcomputer 14 makes reference to the table or performs operation to thereby determine area of the enlarged image generation region E.

Figure 15:
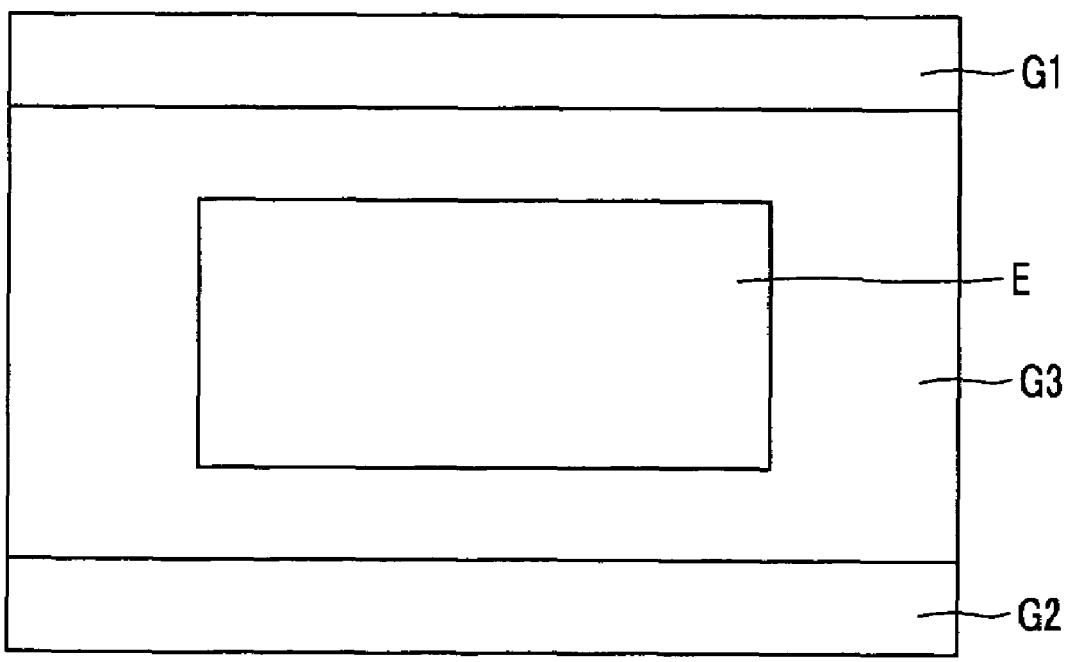
FIG. 15 is a view showing another relationship between an image signal removed as the result of the fact that output is controlled from CCD and an image signal removed as the result of the fact that read-out from memory is controlled in the case where image generation region is set.

It is to be noted that while there is employed, in this embodiment, such an approach in which the microcomputer 14 controls the TG 12 to thereby remove image signals outputted from excess pixels positioned at both end sides in the vertical direction, and to control address of image signal to be read out from the memory 6 to thereby remove image signals outputted from excess pixels positioned at both ends in the horizontal direction to thereby deliver image signal of the enlarged image generation region E to the display control unit 7, image signal of enlarged image generation region E may be delivered to the display control unit 7 by other method. For example, as shown in FIG. 15, there may be employed an approach in which the microcomputer 14 controls the TG 12 to thereby remove image signals outputted from excess pixels existing within the half region of the end portion side among excess pixels positioned at the upper end side indicated at G 1 in the figure, and image signals outputted from excess pixels existing within the half region of image signals outputted from excess pixels existing within the half region of the lower end portion side indicated at G2 in the figure, and to control address of image signal that the microcomputer 14 reads out from the memory 6 to thereby remove image signals outputted from the remaining excess pixels positioned in the vertical direction indicated by G3 in the figure, and image signals outputted from excess pixels positioned in the horizontal direction.

It is to be noted that the image pick-up apparatus 1 may be caused to be of the configuration capable of displaying, with respect to the display unit 8, image which has been caused to undergo hand movement correction and has been enlarged when electronic zoom is being performed.

Then, explanation will be given by using the flowcharts shown in FIGS. 16 and 17 in connection with the operation of the image pick-up apparatus 1 in the case where image which has been enlarged and has been caused to undergo hand movement correction is displayed with respect to the display unit 8 when the operation mode is still picture image pick-up mode and manual focus control mode, and setting such that auxiliary function is used is made. It is to be noted that processing shown in FIGS. 16 and 17 are processing called every field after the power supply of the image pick-yap apparatus 1 is turned ON.

When image which has been enlarged and has been caused to undergo hand display flag is first turned ON thereafter to perform hand movement correction.

Figure 16:
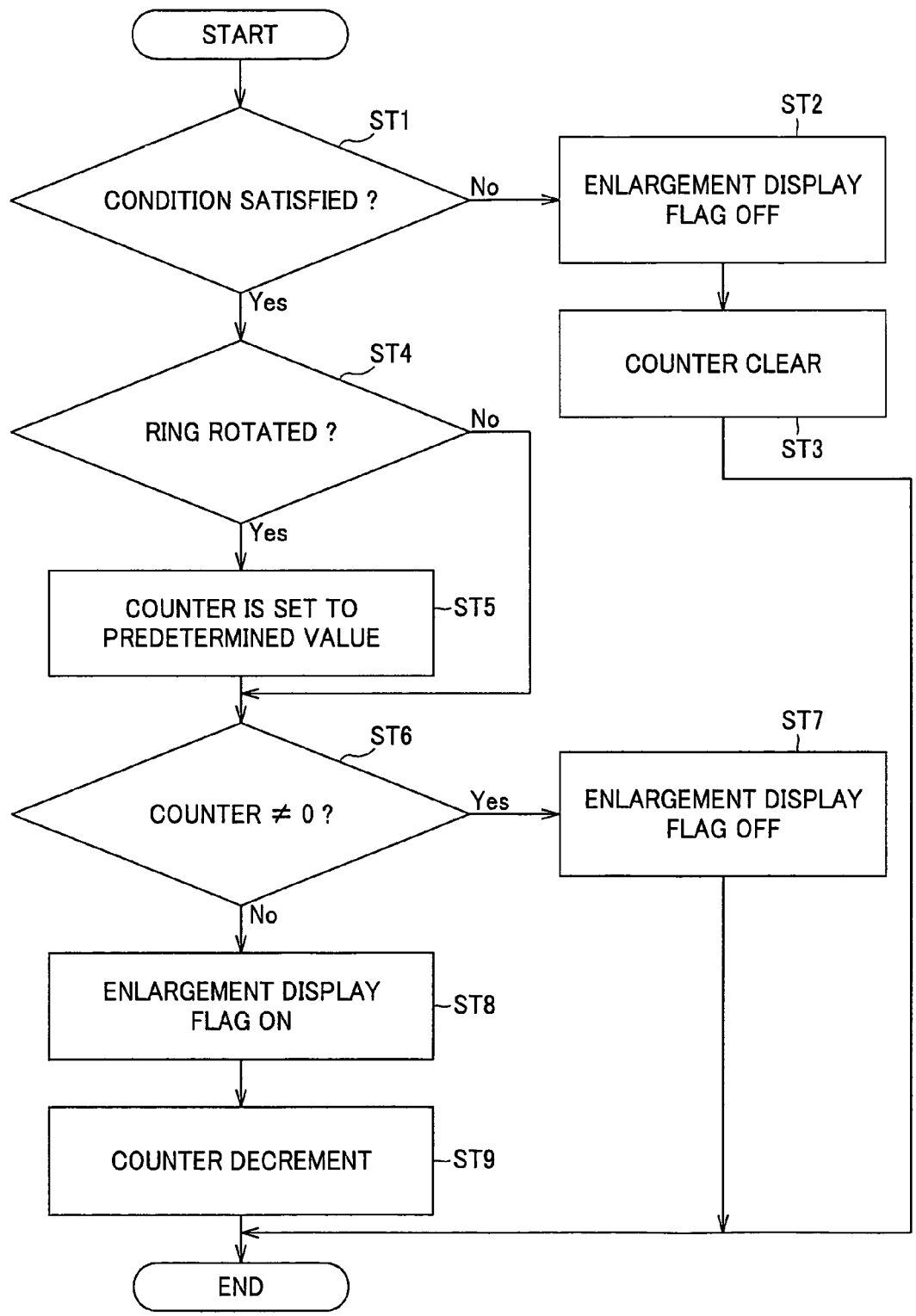
FIG. 16 is a flowchart showing the operation when the image pick-up apparatus to which the present invention is applied turns ON an enlargement display flag.
Figure 17:
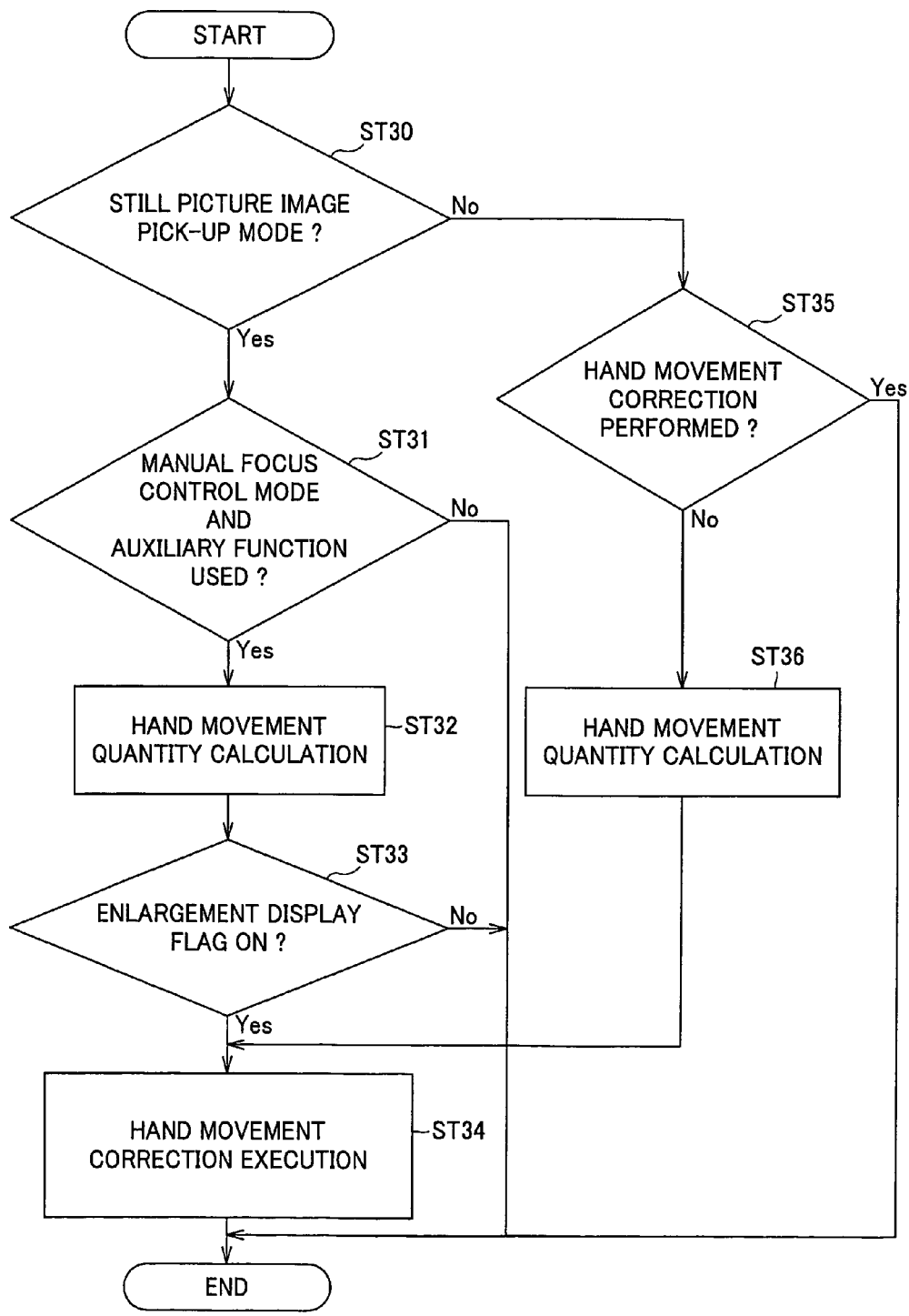

When explanation will be given in practical sense, as shown in the flowchart of FIG. 16, first, at step ST1, the microcomputer 14 judges whether or not the condition for displaying enlarged image on the display unit S is satisfied. When described in detail, the microcomputer 14 confirms that the operation mode is manual focus control mode, setting such that auxiliary function is used is made, the capture button is not placed in deep-pushed state or half pushed state, moving picture is not being recorded, and still picture (image) is not being recorded. When the condition is not satisfied, processing by the microcomputer 14 proceeds to step ST2. When the condition is satisfied, processing by the microcomputer 14 proceeds to step ST4.

At step ST2, the microcomputer 14 turns OFF enlargement display flag. Thus, processing by the microcomputer 14 proceeds to step ST3.

Then, at the step ST3, the microcomputer 14 clears the counter to complete processing.

Moreover, at the step ST4, the microcomputer 14 judges whether or not the ring 24 is rotated. When the ring 24 is rotated, processing by the microcomputer 14 proceeds to step ST5. When the ring 24 is not rotated, processing by the microcomputer 14 proceeds to step ST6.

At the step ST5, the microcomputer 14 sets the counter to a predetermined value. Thus, processing by the microcomputer 14 proceeds to step ST6.

Then, at the step ST6, the microcomputer 14 judges whether or not the counter takes zero. When the counter takes zero, processing by the microcomputer 14 proceeds to step ST7. When the counter does not take zero, processing by the microcomputer 14 proceeds to step ST8.

At step ST7, the microcomputer 14 turns OFF the enlargement display flag to complete processing.

Moreover, at step ST8, the microcomputer 14 sets enlarged image generation region E to enlarge image to be displayed on the display unit 8 and turns ON the enlargement display flag. Thus, processing by the microcomputer 14 proceeds to step ST9.

Then, at step ST9, decrement of the counter is performed to complete processing.

By performing the above-mentioned operation, the enlargement display flag is turned ON or OFF. Further, when the enlargement display flag is turned ON, the microcomputer 14 performs hand movement correction of image displayed in the enlarged state on the display unit 8.

FIG. 17 is a flowchart showing the operation in the case where the image pickup apparatus to which the present invention is applied performs hand movement correction when the enlargement display flag is turned ON. Referring to FIG. 17, at step 530, the microcomputer 14 judges whether or not the operation mode is still picture image pick-up mode. When the operation mode is still picture image pick-up mode, processing by the microcomputer 14 proceeds to step ST31. When the operation mode is moving picture image pick-up mode, processing by the microcomputer 14 proceeds to step ST35.

Then, at step ST 31, the microcomputer 14 judges whether or not the operation mode is manual focus control mode and setting such that auxiliary function is used is made. When the operation mode is manual focus control mode and setting such that auxiliary function is used is made, processing by the microcomputer 14 proceeds to step ST32. When the operation mode is not the manual focus control mode and the auxiliary function is not invoked, processing by the microcomputer 14 is completed.

Then, at step ST32, the microcomputer 14 performs calculation of hand movement quantity.

Then, at step ST33, the microcomputer 14 judges whether the flag indicating that an enlarged image is displayed on the display unit 8 is turned ON or OFF. When the flag is ON, processing by the microcomputer 14 proceeds to step ST34. When the flag is OFF, processing by the microcomputer 14 is completed.

Then, at step ST34, the microcomputer 14 performs hand movement correction for the enlarged image displayed on the display unit 8. Namely, the enlarged image generation region E is set at a position that is moved from a predetermined position by a quantity corresponding to the hand movement quantity. Further, the microcomputer 14 controls the TG 12 and the memory 6 to deliver an image signal corresponding to the enlarged image generation region E to the display control unit 7.

In this example, when it is judged at step ST30 that the operation mode is the moving picture image pick-up mode, the microcomputer 14 judges at step ST35 whether or not hand movement correction has been performed. When hand movement correction has been performed, the processing proceeds to step ST36. When hand movement correction has not been performed, processing by the microcomputer 14 is completed.

Further, at step ST36, the microcomputer 14 calculates a hand movement quantity. Thus, processing by the microcomputer 14 proceeds to step ST 34.

Next, an explanation will be provide in connection with the operation of the image pick-up apparatus 1 in the case where auto focus control, iris quantity control and white balance control are performed when the operation mode is auto focus control mode.

When hand movement takes place at the image pick-up apparatus 1, angular velocity is detected by the angular velocity detecting unit 10. As a result, V angular velocity signal and H angular velocity signal are outputted, and are delivered to the angular velocity signal processing unit 11. The angular velocity signal processing unit 11 implements band limitation and amplification to the V angular velocity signal and the H angular velocity signal. The V angular velocity signal and the H angular velocity signal to which band limitation and amplification have been implemented are delivered to the microcomputer 14.

Figure 18:
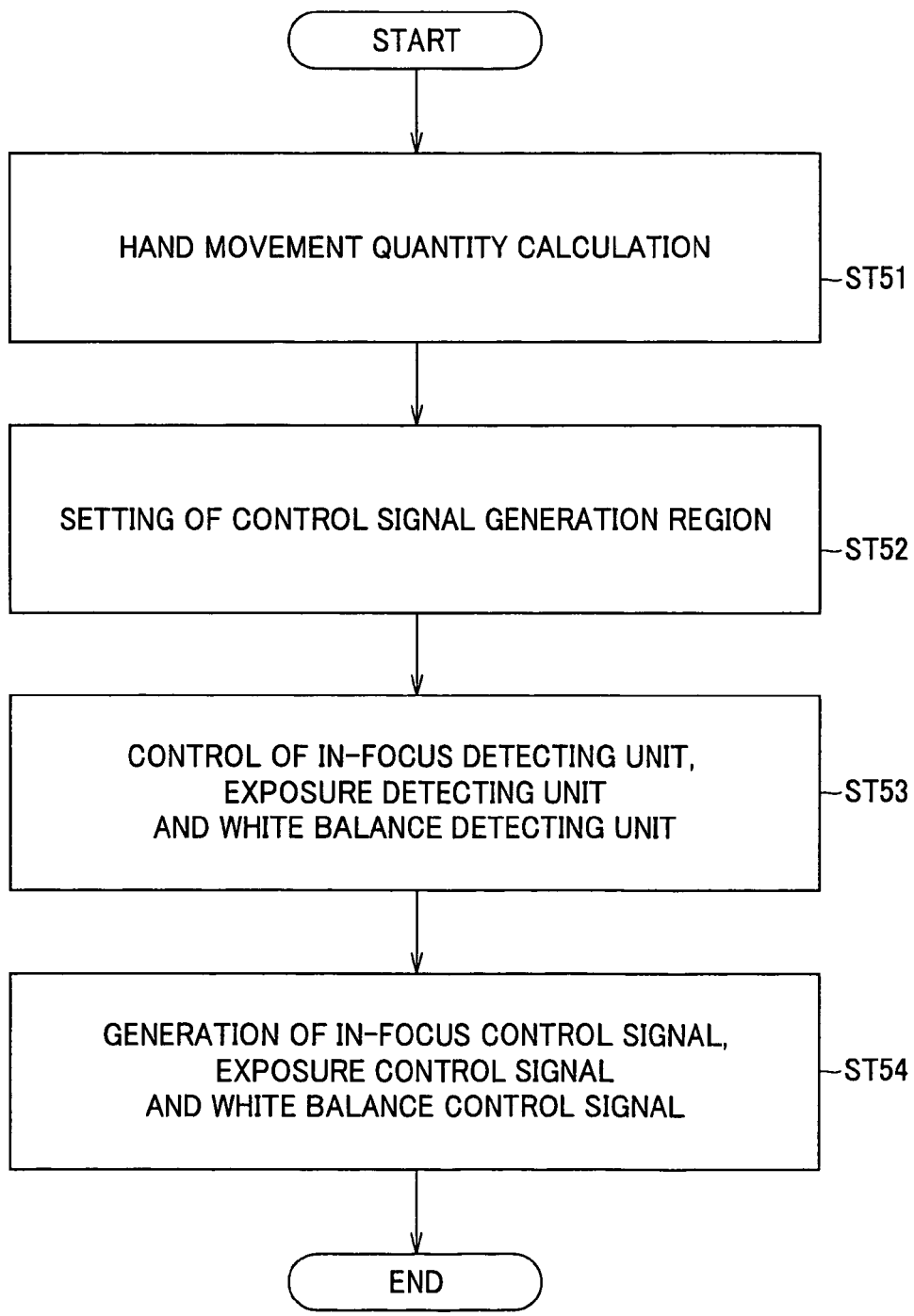
FIG. 18 is a flowchart showing the operation in the case where focus control, exposure control and white balance control are performed when the image pick-up apparatus to which the present invention is applied is in still picture image pick-up mode and auto focus control mode.

Then, as shown in the flowchart of FIG. 18, at step ST51, a hand movement quantity calculation unit 142 calculates hand movement quantity from the V angular velocity signal and the H angular velocity signal which have been delivered from the angular velocity signal processing unit 11.

Then, at step ST52, the microcomputer 14 serves to move the position of the control signal generation region A from a predetermined position by quantity corresponding to hand movement quantity calculated at the step ST-51 to make setting thereof.

Then, at step ST53, the microcomputer 14 controls the in focus detecting unit 52, the exposure detecting unit 53 and the white balance detecting unit 54 on the basis of position of the control signal generation region A which has been set at the step ST52. The in focus detecting unit 52 generates focus detection signal S1 from image signal outputted from the control signal generation region A to deliver the focus detection signal S1 to the microcomputer 14. The exposure detecting unit 53 generates exposure detection signal S2 from image signal outputted from the control signal generation region A to deliver the exposure detection signal S2 to the microcomputer 14. The white balance detecting unit 54 generates white balance detection signal S3 from the image signal which has been outputted from the control signal generation region A to deliver the white balance detection signal S3 to the microcomputer 14.

Then, at step ST54, the microcomputer 14 generates focus control signal S4 on the basis of the exposure detection signal S2 to deliver these signals to the drive unit 9. Moreover, the microcomputer 14 generates white balance control signal S6 on the basis of the white balance detection signal S3 to deliver the white balance control signal S6 to the white balance amplifier.

The drive unit 9 moves the focus lens 21 on the basis of focus control signal S4 to perform focus control and changes size of the aperture portion 23a on the basis of the exposure control signal S5 to control quantity of light outputted from the lens unit 2. In addition, the white balance amplifier allows color signal to be a predetermined value on the basis of white balance amplifier control signal S6.

As explained above, in accordance with the image pick-up apparatus 1 to which the present invention has been applied, when the operation mode is the manual focus control mode and the auxiliary function is invoked, the microcomputer 14 first sets enlarged image generation region E at a position moved by hand movement quantity from a predetermined position within the image generation region B. Further, the display processing unit 7 generates, from image signal of enlarged image generation region E, image enlarged so as to take a predetermined size to display the image thus generated on the display unit 8.

Accordingly, although the image pick-up apparatus 1 to which the present invention is applied employs the electronic hand movement correction system, hand movement correction may be employed in a manual focus control mode such that effect of hand movement on images displayed during such manual focus operation is reduced or eliminated. Namely, the image pick-up apparatus to which the present invention is applied is advantageous to miniaturization, and is adapted so that user visually confirms image displayed on the display unit 8 to thereby have ability to confirm image which has been enlarged and has been caused to undergo hand movement correction. From this fact, it becomes easy to manually perform suitable focus control.

Moreover, at the image pick-up apparatus 1 to which the present invention is applied, when the operation mode is manual focus control mode, the exposure detecting unit 53 generates exposure detection signal S2 on the basis of image signal of the enlarged image generation region E, and the white balance detecting unit 54 generates white balance detection signal S3 on the basis of such image signal. Further, the microcomputer 14 generates exposure control signal S5 on the basis of exposure detection signal S2, and generates white balance control signal S6 on the basis of white balance detection signal S3.

Further, when the operation mode is auto focus control mode, the image pickup apparatus 1 to which the present invention is applied is operative on the basis of image signal of the control signal generation region A so that the in focus detecting unit 52 generates focus detection signal S, the exposure detecting unit 53 generates exposure detection signal S2, and the white balance detecting unit 54 generates focus control signal S4 on the basis of focus detection signal S1, generates exposure control signal S5 on the basis of exposure detection signal S2, and generates white balance control signal S6 on the basis of white balance detection signal S3.

Accordingly, also when hand movement correction is not performed, the image pick-up apparatus to which the present invention is applied can perform exposure control and white balance control on the basis of an image signal that is less susceptible to the influence of hand movement. Namely, the image pick-up apparatus 1 to which the present invention is applied is advantageous to miniaturization, and is adapted so that also when the operation mode is still picture image pick-up mode in which no hand movement correction is performed, it can display, on the display unit 8, image in which focus, exposure and white balance have been suitably controlled.

It is to be noted that while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth by appended claims.

INDUSTRIAL APPLICABILITY

The image pick-up apparatus according to the present invention can display, on the display unit, an image which has been enlarged and has undergone hand movement correction when it is miniaturized. Namely, user can pick up an image of high accuracy by observing an enlarged hand-movement-corrected version of the image on a display unit.

The invention claimed is:

1. An image pick-up apparatus adapted for enlarging a predetermined region of a picked-up image to display it on a display unit,
the image pick-up apparatus comprising:
an image pick-up device for converting an optical image of an object into an image signal and outputting the image signal;
hand movement detecting means for detecting a hand movement quantity of a user;
image generation region setting means for setting an image generation region at the image pick-up device;
enlarged image generation region setting means for setting an enlarged image generation region within the image generation region; and
image generating means for selectively generating an the image of a predetermined size from an image signal of the image generation region or an image from the enlarged image generation region to display the selected image on the display unit,
wherein the image generation region setting means sets the image generation region within a predetermined region;
the enlarged image generation region setting means sets a set position of the enlarged image generation region at a position moved from a predetermined position in accordance with the hand movement quantity detected by the hand movement detecting means; and
the image generation means generates, from the image signal of the enlarged image generation region, an image enlarged so as to take a predetermined size to display the enlarged image on the display unit,
wherein the hand movement quantity is detected without analyzing image data.

2. The image pick-up apparatus as set forth in claim 1, wherein when the optical image is picked up, the image generation
region setting means sets the image generation region at a predetermined region.

3. The image pick-up apparatus as set forth in claim 1, further comprising manual focus control means for manually controlling a focal point of the image displayed on the display unit, wherein when the focal point is manually controlled by the manual focus control means, the image generating means generates, from an image signal of the enlarged image generation region, an image enlarged so as to take a predetermined size to display the enlarged image on the display unit.

4. The image pick-up apparatus as set forth in claim 1, further comprising image control signal generating means for generating an image control signal from an image signal outputted prom the image pick-up device, wherein the image control signal generating means is operative so that when an enlarged image is displayed on the display unit, the image control signal generating means generates the image control signal from the image signal of the enlarged image generation region.

5. The image pick-up apparatus as set forth in claim 4, wherein the image control signal is an exposure control signal for controlling brightness of the image.

6. The image pick-up apparatus as set forth in claim 4, wherein the image control signal is a white balance control signal for controlling white balance of the image.

7. The image pick-up apparatus as set forth in claim 4, wherein the image control signal is a focus control signal for controlling a focal point of the image.

8. The image pick-up apparatus as set forth in claim 1, wherein the enlarged image generation region setting means sets an area of the enlarged image generation region so that the area continuously becomes narrow with lapse of time.

9. The image pick-up apparatus as set forth in claim 2, wherein the enlarged image generation region setting means sets an area of the enlarged image generation region so that the area discretely becomes narrow with a lapse of time when a focal point is manually controlled by the manual focus control means.

10. An image pick-up apparatus adapted for enlarging a predetermined region of a picked-up image to display it on a display unit, the image pick-up apparatus comprising:

an image pick-up device for converting an optical image of an object into an image signal and outputting the image signal;

hand movement detecting means for detecting a hand movement quantity of a user;

image generation region setting means for setting an image generation region at the image pick-up device;

enlarged image generation region setting means for setting an enlarged image generation region within the image generation region; and image generating means for selectively generating an the image of a predetermined size from an image signal of the image generation region or an image from the enlarged image generation region to display the selected image on the display unit, wherein the image generation region setting means sets the image generation region within a predetermined region;

the enlarged image generation region setting means sets a set position of the enlarged image generation region at a position moved from a predetermined position in accordance with the hand movement quantity detected by the hand movement detecting means; and the image generation means generates, from the image signal of the enlarged image generation region, an image enlarged so as to take a predetermined size to display the enlarged image on the display unit, wherein the image pick-up apparatus further comprises control signal generation region setting means for a control signal generation region;

the control signal generation region setting means sets a set position of the control signal generation region at a position moved from a predetermined position in accordance with the hand movement quantity detected by the hand movement detecting means; and the control signal generating means generates a control signal from an image signal of the control signal generation region.

11. The image pick-up apparatus as set forth in claim 10, wherein the image control signal is a focus control signal for controlling a focal point of the image.

12. The image pick-up apparatus as set forth in claim 10, wherein the image control signal is an exposure control signal for controlling brightness of the image.

13. The image pick-up apparatus as set forth in claim 10, wherein the image control signal is a white balance control signal for controlling white balance of the image.

* * * * *